(12) United States Patent
Polus et al.

(10) Patent No.: US 8,052,831 B2
(45) Date of Patent: Nov. 8, 2011

(54) LOW TEMPERATURE, VACUUM CURE FABRICATION PROCESS FOR LARGE, HONEYCOMB CORE STIFFENED COMPOSITE STRUCTURES

(75) Inventors: Jeffrey E. Polus, Hillsboro, IL (US); James A. Thomas, Ballwin, MO (US); Karen Jost, St. Louis, MO (US); Carlos Fracchia, Ballwin, MO (US); Danny Heineman, Bethalto, IL (US)

(73) Assignee: The Boeing Company, Chicago, IL (US)

( * ) Notice: Subject to any disclaimer, the term of this patent is extended or adjusted under 35 U.S.C. 154(b) by 723 days.

(21) Appl. No.: 11/050,497

(22) Filed: Feb. 2, 2005

(65) Prior Publication Data

US 2006/0172111 A1 Aug. 3, 2006

(51) Int. Cl.
  *B29C 65/02* (2006.01)
(52) U.S. Cl. ........ 156/285; 156/286; 264/511; 264/571; 264/526; 264/544; 264/546; 264/552; 264/553; 264/572
(58) Field of Classification Search .......... 156/285, 156/286, 382; 264/511, 571, 526, 544, 546, 264/552, 553, 572
  See application file for complete search history.

(56) References Cited

U.S. PATENT DOCUMENTS

| | | | |
|---|---|---|---|
| 2,951,004 A * | 8/1960 | Rambosek et. al. ....... 156/306.9 |
| 3,703,422 A * | 11/1972 | Yoshino .......................... 156/87 |
| 4,216,047 A * | 8/1980 | Hilliard et al. ................. 156/285 |
| 4,300,978 A * | 11/1981 | Whitemore et al. .......... 156/581 |
| 4,353,947 A | 10/1982 | Northcutt |
| 5,604,010 A | 2/1997 | Hartz et al. |
| 5,624,728 A | 4/1997 | Hoopingarner et al. |
| 5,741,456 A | 4/1998 | Ayrton |
| 5,876,546 A | 3/1999 | Cloud |
| 5,897,739 A | 4/1999 | Forster et al. |
| 6,180,206 B1 | 1/2001 | Kain, Jr. |
| 6,451,241 B1 | 9/2002 | Ohliger et al. |
| 6,630,093 B1 | 10/2003 | Jones |
| 6,645,333 B2 * | 11/2003 | Johnson et al. .................. 156/92 |
| 6,676,785 B2 * | 1/2004 | Johnson et al. .................. 156/92 |
| 6,767,606 B2 | 7/2004 | Jackson et al. |
| 7,074,287 B2 * | 7/2006 | Belleguic et al. ............... 156/64 |
| 2002/0069962 A1 * | 6/2002 | Maxwell et al. .............. 156/286 |
| 2003/0143373 A1 | 7/2003 | Bledsoe et al. |
| 2003/0219578 A1 * | 11/2003 | Jones et al. ................ 428/292.1 |

FOREIGN PATENT DOCUMENTS

WO WO03/090202 * 10/2003

* cited by examiner

*Primary Examiner* — Christopher Schatz
(74) *Attorney, Agent, or Firm* — Harness, Dickey & Pierce, P.L.C.

(57) ABSTRACT

A method for making a honeycomb composite structure wherein the method allows for fluid flow from cells of a honeycomb core during a cure process. More specifically, the method involves forming one or more vents in a skin of the structure, which are preferably filled with venting wicks, to allow for fluid flow before being sealed by the polymer matrix during a skin bonding process. Additionally, the structure preferably comprises a scrim that allows for fluid flow between multiple cells of the honeycomb core. The honeycomb composite structure produced according to this process comprises, among other things, a sealed venting region that comprises a polymer matrix and fibers that are transverse to the skin.

18 Claims, 3 Drawing Sheets

LOW TEMPERATURE, VACUUM CURE FABRICATION PROCESS FOR LARGE, HONEYCOMB CORE STIFFENED COMPOSITE STRUCTURES

BACKGROUND

1. Field of Disclosure

This disclosure relates generally to honeycomb core stiffened composite structures and a method for making the same and, more particularly, to a method for making such structures that allows for fluid flow from cells of a honeycomb core during a cure process. Advantageously, the method of the present disclosure may be used to effectively bond the components of such structures using heat and vacuum, and not super atmospheric pressure, which eliminates the need for bonding the components in an autoclave.

2. Description of Related Art

Honeycomb core sandwich panels or composite structures, which typically comprise composite laminate skins co-cured with adhesives to the honeycomb core, are widely used in the aerospace applications, among others, because of their high stiffness-to-weight (i.e., "specific stiffness") and strength to weight (i.e., "specific strength") ratios.

Honeycomb core composite structures may be fabricated utilizing various composite forming methods. The most commonly employed technique involves the use of a vacuum bag molding assembly wherein an impervious membrane or "vacuum bag" is employed for consolidating the composite skins or layers and ensuring proper adhesion thereof to the centrally disposed honeycomb core. More specifically, the lower or base composite skin, the honeycomb core, and the upper or face composite skin are sequentially laid in a rigid mold member so that the honeycomb core is overlaid or covered by the upper and lower composite skins. The upper and lower composite skins are typically formed from uncured "prepreg" or "B-stage" laminates that comprises a fiber reinforcement such as graphite, aramid, or fiberglass fibers (e.g., linear, weaves, or both) disposed in a binding polymeric matrix such as epoxy, phenolic, or other similar organic resinous material. Film adhesive typically forms the bonds between the upper and lower composite skins and the honeycomb core. A vacuum bag is disposed over the rigid mold member and seals thereto thereby forming a mold cavity that is occupied by the uncured/unbonded composite lay-up. The mold cavity is then evacuated to subatmospheric pressure within the mold, superatmospheric pressure is applied to the exterior (in an autoclave oven), and the temperature of the composite lay-up is increased while in the autoclave oven to cure the lay-up. The combination of subatmospheric internal pressure and superatmospheric external pressure tend to consolidate the composite skins, remove air and volatiles from the resin binder, and apply the necessary compaction pressure to ensure full and uniform adhesion of the lay-up.

The use of an autoclave during the formation of the composite structure may, in certain circumstances, be less than desirable. For example, the use of superatmospheric pressure on the composite during the cure is more likely to result in shifting, distortion, or both of the honeycomb core (typically near the edge) in the direction generally transverse to the cells. Additionally, using superatmospheric pressure during the formation of relatively large structures (e.g., having a size, e.g., a length and width, that is greater than about 1 m$^2$) requires unusually large and costly autoclaves. Without superatmospheric pressure, it has been difficult, if not impossible, to produce structures with sufficient strength and ruggedness because of inadequate compaction of the laminate layers, inadequate bonding of the honeycomb core and skins, or both. This is believed to be due, at least in part, to the increased gaseous pressure within the structure during the process of curing bonding, or both. Specifically, in addition to the expansion of the air in the cells according to universal gas equation (PV=nRT), the evolution of volatiles from, for example, the polymeric matrix of the lay-up or absorbed moisture within the honeycomb core, tend to increase the pressure within the cells, which tends to separate the skin(s) and the honeycomb core. Thus, a need exists for a method of forming honeycomb composite structures, especially those greater than about 1 m$^2$ in size, that does not require the application of superatmospheric pressure and still provides for adequate bonding of the skin(s) and the honeycomb core.

SUMMARY

The present disclosure is directed to a method for forming a honeycomb composite structure that comprises a first skin, a second skin, and a honeycomb core disposed between and bonded to the first and second skins, wherein each of the first and second skins comprises at least one fibrous sheet and a polymer matrix and is cured or uncured. The method comprises placing a scrim between the honeycomb core and at least one of the first and second skins to allow fluid flow between cells of the honeycomb core during a bonding of the at least one of the first and second skins and the honeycomb core. Also, perforating at least one of the first and second skins with at least one vent sized to allow fluid flow before being sealed by the polymer matrix during the bonding of at least one of the first and second skins and the honeycomb core. Additionally, bonding the at least one of the first and second skins and the honeycomb core.

The present disclosure is also directed to a method for forming a honeycomb composite structure that comprises a face skin, a base skin, and a honeycomb core disposed between and bonded to the face and base skins. The method comprises forming a face lay-up over the honeycomb core and the base skin, which are bonded, wherein the face lay-up comprises a scrim on the honeycomb core, an adhesive layer on the honeycomb core, the scrim, and a portion of the base skin being bonded with the face lay-up, and a multiplicity of prepreg sheets, which comprise a fabric and a polymer matrix, on the adhesive layer. A vent is formed through a portion of the face lay-up that overlies the honeycomb core, wherein the vent is sized to allow fluid flow before being sealed by the polymer matrix during a co-bonding operation. A fibrous venting wick is placed through the vent, wherein at least a portion of the fibrous wick integrates with the face skin during the co-bonding operation. Co-bonding the face lay-up is performed to laminate the multiplicity of prepreg sheets to form the face skin and to bond the face skin, the honeycomb core, and the base skin.

Additionally, the present disclosure is directed to a honeycomb composite. The honeycomb composite structure comprises a first skin, a second skin, and a honeycomb core disposed between and bonded to the first and second skins, wherein at least one of the first and second skins comprises an outer surface; an inner surface to which at least a portion of the honeycomb core is bonded; at least one fibrous sheet that comprises fibers aligned substantially parallel to the outer surface, the inner surface, or both; a polymer matrix; and a sealed venting region adjacent the honeycomb core extending from the inner surface to the outer surface that comprises the polymer matrix and fibers that are transverse to the outer surface, the inner surface, or both.

DETAILED DESCRIPTION OF VARIOUS EMBODIMENTS

The present disclosure is generally directed to a method for forming a honeycomb composite structure in which the interior of the composite is vented during at least a portion of the process of curing, bonding, or both. This venting allows for the skin or skins and the core to be adequately bonded without applying superatmospheric pressure to the exterior of the composite. Thus, although the venting method of the present disclosure may be used in an autoclave-based operation, it is not required. By obviating the autoclave, the present disclosure is a convenient and cost-effective method for forming adequately bonded honeycomb composite structures, especially relatively large structures (e.g., greater than about 1 m$^2$ in size).

As described above and as is known to those of skill in the art, major components of a honeycomb composite structure are the skins. The skins or composite skins used in the method of the present disclosure may be of any type known to those of skill in the art. A skin is formed of at least one and typically a multiplicity of prepreg sheets. Although more than a single prepreg sheet is typically used to make a skin, the number of prepreg layers depends, at least in part, on the desired structural component's weight, strength, dimensions, end use, or a combination thereof. Typically, the thickness of a prepreg layer is between about 0.28 and about 0.38 mm. Generally, the thickness of a skin over a honeycomb core is the result of laminating between about four and about six prepreg layers.

Prepreg sheets typically comprise a fiber fabric (e.g., fiberglass fibers, carbon fibers, aramid fibers, silicon carbide fibers, and Kevlar® fibers) impregnated with a polymer matrix. As is well known, an appropriate fiber fabric may comprise fibers that are unidirectional or multidirectional. Additionally, a particular skin lay-up may comprise fabrics with different fiber orientations. Appropriate materials for the polymer matrix are known to those of skill in the art and include, for example, bismaleimide (BMI) resin, epoxies, phenolics, or other similar organic resinous materials. Examples of suitable prepreg layers include LTM45EL/CF0108, which is commercially available from Advanced Composites Group, and Cycom-5215/WAS4C-5HS, which is commercially available from Cytec Engineered Materials.

The other major component is the honeycomb core, and, likewise, appropriate honeycomb cores are known to those of skill in the art. Examples of appropriate cores include those that comprise or those that are made or constructed of metals such as aluminum and titanium, or non-metallics such as fiberglass/phenolics and Nomex®, which is an aramid fiber or fabric that is commercially available from Hexcel Corp. of Chatsworth, Calif. Generally, honeycomb core is purchased in bulk and machined to the desired shape and size using a computer numerically controlled machining apparatus. For example, the honeycomb core may have a ramped surface to gradually transfer shear loads to the cured skins (see, e.g., FIG. 3), a right-angled surface, a rounded surface, a combination thereof.

The method of the present disclosure for fabricating honeycomb composite structures, more specifically, comprises forming at least one hole or vent through one or more skins, particularly the portion(s) of the skin(s) adjacent to the cells of the honeycomb core to allow for fluid flow from the interior of the structure during a portion of a thermally-driven process in which one or more skins and the honeycomb core are bonded, in which one or more skins are cured or laminated, or a combination thereof. In conjunction with the vent or vents, it is preferred that the composite structure being bonded also comprises a scrim between the core and a skin being bonded to the core to allow for fluid flow or connection between multiple cells of the honeycomb core and the at least one vent. Without the scrim, it would be preferred to have at least one vent over each cell of the honeycomb core. This option is less than desirable for reasons such as cost and structural integrity. Thus, the use of a scrim is highly desirable. In view of the foregoing, the present disclosure may be implemented when bonding a honeycomb core and cured skins, or when curing and bonding at least one lay-up and a honeycomb core (this is commonly referred to as "co-bonding").

Although it is possible for the present disclosure to be carried out by forming holes or vents in a previously cured, partially cured, or B-staged skin or laminate (e.g., by drilling), this is generally considered to be a less than desirable manner of venting the composite structure during the bonding of one or more skins. Rather, the method of the present disclosure preferably comprises forming holes or vents in one or more uncured skins or lay-ups. For example, one particular co-bonding fabrication method generally involves laying up and curing a base skin, bonding the cured base skin and a honeycomb core, laying up a face skin over the honeycomb core and at least a portion of the base skin extending from the periphery of the core, forming at least one vent in the portion of the face lay-up over the core, and co-bonding the face skin to form the honeycomb composite structure. Alternatively, the method of the present disclosure may be implemented by forming a base lay-up, placing the honeycomb core on the base lay-up, forming a face lay-up, forming at least one vent in the face lay-up, base lay-up, or both, and co-bonding the lay-ups and the honeycomb core to form the honeycomb composite structure.

As described above, the method of the present disclosure comprises sufficiently venting the structure during at least a portion of the bonding or co-bonding of at least one skin and the honeycomb core. Sufficiently venting the structure in accordance with the present disclosure comprises forming at least one hole, vent, void, or substantial absence of material extending through at least one skin (cured, partially cured, or uncured) and placing a scrim between the core and a skin being bonded thereto so that the skin or skins being bonded to the honeycomb core form an adequate bond. In other words, the amount of open space or passageway between the core and the skin and through the skin is preferably sufficient to allow enough gas (e.g., air and volatilized compounds) to flow from the interior of the composite during the curing-bonding operation, which prevents a substantial pressure increase within the structure, such that enough contact is maintained between the skin(s) and the core to adequately bond them.

Although sufficient venting may be accomplished with a single vent, results to date generally indicate that a multiplicity of vents is preferred. Specifically, results to date indicate that the vents are preferably at a concentration that is at least about 0.5 vents per square foot (about 5.4 vents per square meter). More preferably, the concentration is at least about 0.75 vents per square foot (about 8 vents per square meter). On the other hand, it is generally desirable to minimize the number of vents to maximize the strength of the composite structure or minimize any degradation to the physical properties of the skin, structure, or both. Thus, it is generally believed that the vent concentration is preferably no greater than about 21.5 vents per square meter (about 2 per square foot) and more preferably no greater than about 16 vents per square meter (about 1.5 per square foot). In one embodiment of the present disclosure a multiplicity of vents are formed in the skin above or adjacent to the honeycomb core at a concentration of about 11 vents per square meter (about 1 vent per square foot).

As mentioned above, in addition to at least one vent, the present disclosure comprises placing a scrim between the honeycomb core and a skin that are being bonded to allow for fluid communication or flow between cells of the honeycomb core, which, in turn, allows for fluid flow from multiple cells and the at least one vent. The scrim may be formed from any material that has openings small enough to maintain the fluid connection. In general, the fluid connection is maintained by scrim openings that are smaller than the cells of the honeycomb core. For example, if the cells of the core are about 6.4 mm (about 0.25 inches) across, then the size of the openings (i.e., the distance across the opening at the most distant locations along an opening's periphery) is less than about 6.4 mm (about 0.25 inches). On the other hand, the openings are preferably large enough to allow for an adhesive (preferably a film adhesive, epoxy or BMI) to adequately contact the core for bonding. Additionally, the scrim preferably has a thickness that is not so great so as to prevent an adhesive from bonding the skin and core. Stated another way, the scrim is preferably thin enough so that it is "wet out" by the adhesive. In general, as the film adhesive weight is increased, the thickness of the scrim may be increased while still allowing it to be "wet out." Further, the scrim is preferably flexible so that it may conform to the shape of the core. In view of the foregoing, it has been discovered that the scrim is preferably an open knit fabric made from any appropriate material such as a polymeric fibers or filaments. Examples of such polymeric fibers or filaments include nylon and polyester.

In one embodiment of the present disclosure, a film adhesive such as FM300-2 is used to bond the core and a skin. Film adhesive FM300-2 comprises a scrim that is about 0.18 mm (about 7 mils) thick and has a weight of about 0.5 kg/m$^2$ (about 0.1 lbs/ft$^2$). Film adhesives typically comprise a scrim to facilitate handling. Additionally, the assembly preferably comprises a "dry" scrim (i.e., a scrim not impregnated with adhesive) between the core and the skin. More specifically, the scrim order of the layers is preferably core, scrim, film adhesive, and skin. Appropriate dry scrims for this embodiment include style 1191 nylon and style 5602 polyester having thicknesses between about 0.13 and about 0.18 mm (about 5 and about 7 mills).

In addition to sufficiently venting the structure to allow adequate bonding, the method of the present disclosure enables forming a composite structure that is at least substantially sealed and preferably completely sealed. These two seemingly opposed qualities are achieved by the careful selection of the size or cross-sectional length of the vent(s) (i.e., the greatest distance between any two points along the interface between the outer skin surface and the void). For example, for a vent comprising a generally cylindrical surface, the size or cross-sectional length is about the diameter of the generally circular interface between the outer skin surface and void. Such a generally cylindrical vent may be formed for example, by a drill bit, in the case of cured skin, or by an awl, in the case of an uncured lay-up. It is important to note that the cross-sectional shape of the vents need not be circular; the vents may have any cross-sectional shape (e.g., oval-like, square-like, or rectangle-like). It is also important to note that the vent(s), although typically substantially perpendicular or normal to the outer surface of a skin, need not be. The vent(s) need only be transverse to the skin.

Specifically, the size of the vent(s) is selected so that there is adequate bonding while allowing the vents to be at least substantially sealed by the flow of the polymer matrix during the process of curing, bonding, or both. For example, results to date indicate that the size of the vents is preferably no greater than about 3.2 mm (about 0.125 inches) to ensure the vents ultimately become sealed. More preferably, the size of the vents is preferably no greater than about 2.5 mm (about 0.1 inches). On the other hand, it is preferred that the size of the vents is at least about 1.3 mm (about 0.05 inches) and preferably at least about 2.3 mm (about 0.09 inches) to ensure that the vents remain sufficiently open during the curing/bonding operation (i.e., the holes do not become sealed before a sufficient amount of gas has exited the structure).

Optionally, the method of the present disclosure further comprises inserting at least one fibrous venting wick into at least one of the vents. Without being held to a particular theory, it is believed that placing a venting wick in the vent(s) provides one or more of the following benefits: helps maintain the flow of gas from the interior of the composite structure by, for example, resisting premature sealing of a vent by the polymer matrix, or by resisting a shift in the fibers of a lay-up that may tend to decrease the size of the vent or close the vent; helps in the eventual sealing of the vent by easing the flow of the polymer matrix through the void; and provides reinforcement of the sealed vent, which helps reduce any possible decrease in the strength or toughness of the composite structure that may result from creating the vent(s).

The insertion of the fibrous venting wick may be accomplished by essentially any method. One such method may comprise placing a wick into the opening of a vent at or near the outer surface and pushing it further into or preferably through the vent such that at least a portion of the wick extends outward from the inner surface of the skin (cured or lay-up). In other words, it is preferred that a portion of the wick extend into a cell of the honeycomb core. Likewise, it is generally preferred for a portion of the wick to extend outward from the outer surface of the skin (i.e., outside the composite structure). Preferably, the length of venting wick that extends outward from the outer surface of the skin is at least about 12.5 mm (about 0.5 inches), but no more than about 19 mm (about 0.75 inches). Without being held to a particular theory, it is believed that this external length, when collapsed over onto the outer surface, helps maintain the venting wick in place so that it does not fall through the vent during a curing/bonding operation. For the portion of the wick outside the composite structure it is preferred that the fibers be "fanned out" (i.e., that fibers of the wick are separated and arranged in a substantially circular pattern in which the fibers are positioned as radii of a circle) to minimize the "mark-off" (i.e., the formation of an impression or the partial embedding of the fibers) in the skin or on the outer surface of the skin during the curing/bonding operation. Before "fanning" the wick, it is preferably passed through the release film(s) to ensure fluid flow from the core (see, e.g., FIGS. 2 and 3).

As mentioned above, the venting wick is preferably fibrous (i.e., it comprises a multiplicity of fibers or filaments). Preferably, those filaments are compatible (e.g., do not degrade, do not chemically react with, and do not corrode) with the fibers of the skin and the polymer matrix. Additionally, it is desirable for the venting wick filaments to be wettable by the polymer matrix to facilitate the migration of polymer matrix through the wick to help seal the vent. Examples of appropriate venting wick materials include fiberglass, carbon, aramid, silicon carbide, and KEVLAR®. Further, the fibrous venting wick may be made of the same or different fibers as that of the skin. In fact, in one embodiment of the present disclosure the skin comprises carbon fibers and the venting wick comprises fiberglass fibers, which tend to be desirable because fiberglass strands or strings from which the wicks may be cut are readily available in numerous sizes and configurations at a relatively low cost.

As describe above, if present, the wick preferably becomes a part of or is integrated into the honeycomb composite structure. Thus, a honeycomb composite structure formed according to the process of the present disclosure may comprise a first skin, a second skin, and a honeycomb core disposed between and bonded to the skins, wherein at least one of the skins comprises an outer surface, an inner surface to which at least a portion of the honeycomb core is bonded, at least one fibrous sheet that comprises fibers aligned substantially parallel to the outer surface, the inner surface, or both, a polymer matrix, and at least one sealed venting region extending from the inner surface to the outer surface and comprising fibers that are transverse to the outer surface, the inner surface, or both, and the polymer matrix. Preferably, a honeycomb composite structure of the present disclosure reflects the preferences set forth herein regarding the process (e.g., the formation of the vents, including their size and concentration, the wick material, etc.). After the curing/bonding operation, it is generally preferable to trim the wick by cutting or otherwise severing the wick at or near the outer surface of the skin.

A further option to the process of the present disclosure includes forming, placing, and bonding a relatively small (e.g., about 25.4 to about 38.1 mm diameter (about 1 to about 1.5 inch diameter)) patch or cover over the sealed venting region(s) to further ensure the composite structure is adequately sealed, structurally sound, or both. Such a patching process is well known to those of skill in the art and is a standard method of repairing a honeycomb composite structure and generally comprises lightly sanding the surface of skin (e.g., with a 180 grit sand paper) that will be contacted with the patch (i.e., the outer surfaces of the sealed venting region and the cured skin thereabout), cleaning the sanded area to remove dust, placing an about 38 mm (about 1.5 inch) diameter fabric circle that is wetted with an epoxy adhesive (i.e., the patch) on the cleaned area, and curing the patch.

It is important to note that the foregoing steps of the method of the present disclosure may be incorporated into essentially any manufacturing process for fabricating or forming honeycomb composite structures and may be utilized with essentially any material and equipment associated therewith (e.g., film adhesives; scrims; vacuum pumps; vacuum bags or nylon bagging film; vacuum bag sealant; molds or tools; mold release; non-woven breather films; double sided tapes; edge dams made from, for example, cork; bleeder layers made from, for example fiberglass, non-porous release films; non-porous release fabrics; rigid caul plates; other adhesives such as epoxies; edge breather cord made from, for example, fiberglass, etc.). Such manufacturing processes and materials are known to those of skill in the art and need not be set forth in detail herein. Although not necessary, a general description of a fabrication process that comprises an embodiment of the present disclosure is set forth below With respect to the size or diameter of the wick, it is preferably sized to fit snugly in the vent. This is typically accomplished by selecting a string having a diameter about that of that of the vent's cross-sectional length. For example, for vents having a cross-sectional length that is no greater than about 3.2 mm (about 0.125 inches) acceptable venting wicks may be cut from 3 k carbon tow (i.e., the tow is made of 3,000 carbon filaments) or fiberglass edge breather string measuring between about 1.8 and about 3.0 mm (between about 0.07 and about 0.12 inches) in diameter.

Exemplary Honeycomb Composite Fabrication Process

This exemplary process generally involves forming a composite laminate or solid laminate base skin, bonding a honeycomb core to the cured base skin, and co-bonding composite face sheets or layers to form the face skin and bond the face skin and the cured base skin-core assembly.

A. Forming a Composite Laminate

Figure 1:
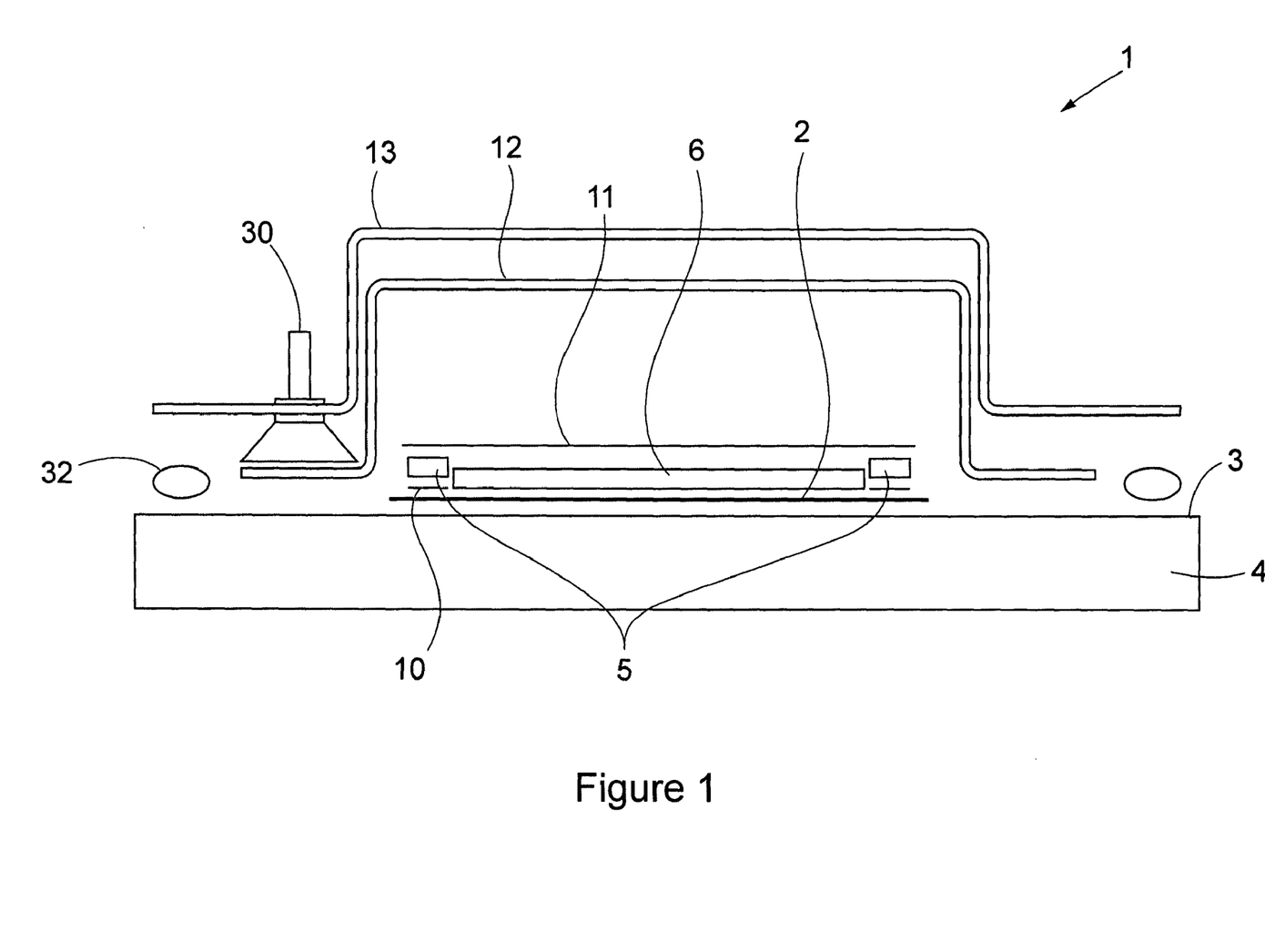
FIG. 1 is a diagrammatic view of a bond jig that includes a lay-up of a composite part for debulking.

Referring to FIG. 1, the process typically begins by preparing a bond jig 1. The bond jig 1 is prepared by applying a uniform coating of a mold release 2 on the surface 3 of the bond tool 4 in accordance with the instructions of the mold release manufacturer. Exemplary mold releases include FREKOTE 700NC, which is commercially available from Henkel Aerospace. Second, cork dams 5, which are taller than the undebulked thickness of the composite part 6, are adhered to the mold release with double side tape 10 disposed therebetween. Next, the composite part 6, in this case the base skin, is formed by laying-up a stack of prepreg sheets (not shown in detail in the drawing but well-known in the art) on the mold release 2 and within the area bordered by cork dams 5. The prepreg sheets are appropriately sized, shaped, and positioned according to the composite structure that is being formed.

The stack of prepreg sheets are then preferably debulked. The debulking may be accomplished by applying a vacuum to them. This typically involves covering them with at least one layer of perforated release film 11, followed by at least one ply of a non-woven breather cloth 12, which is followed by a vacuum bagging film 13. A plurality of vacuum ports 30 (only one of which is shown in the drawing) extend through the outer circumference of the vacuum bagging film 13. The vacuum ports 30 preferably are located just outside the outer perimeter of the dams so that they contact the breather cloth 12. The vacuum bagging film 13 is attached to the surface 3 of the bond tool 4 by a vacuum bag sealant 32. The vacuum bag sealant 32 extends a few centimeters or a few inches outside the outer perimeter of the breather cloth 12. Vacuum hoses (not shown, but well-known in the art) are connected to the vacuum ports 30 and vacuum (e.g., at least about 0.085 MPa (about 25 in-Hg)) is applied to the vacuum bagging film 13 to debulk the prepreg sheets. To debulk the prepreg sheets, the vacuum is typically maintained for a few minutes (e.g., between about 3 and about 15 minutes). Although not required, the last sheet of prepreg is typically covered with an impregnated nylon peel ply (not shown in the drawing) after the debulking.

Figure 2:
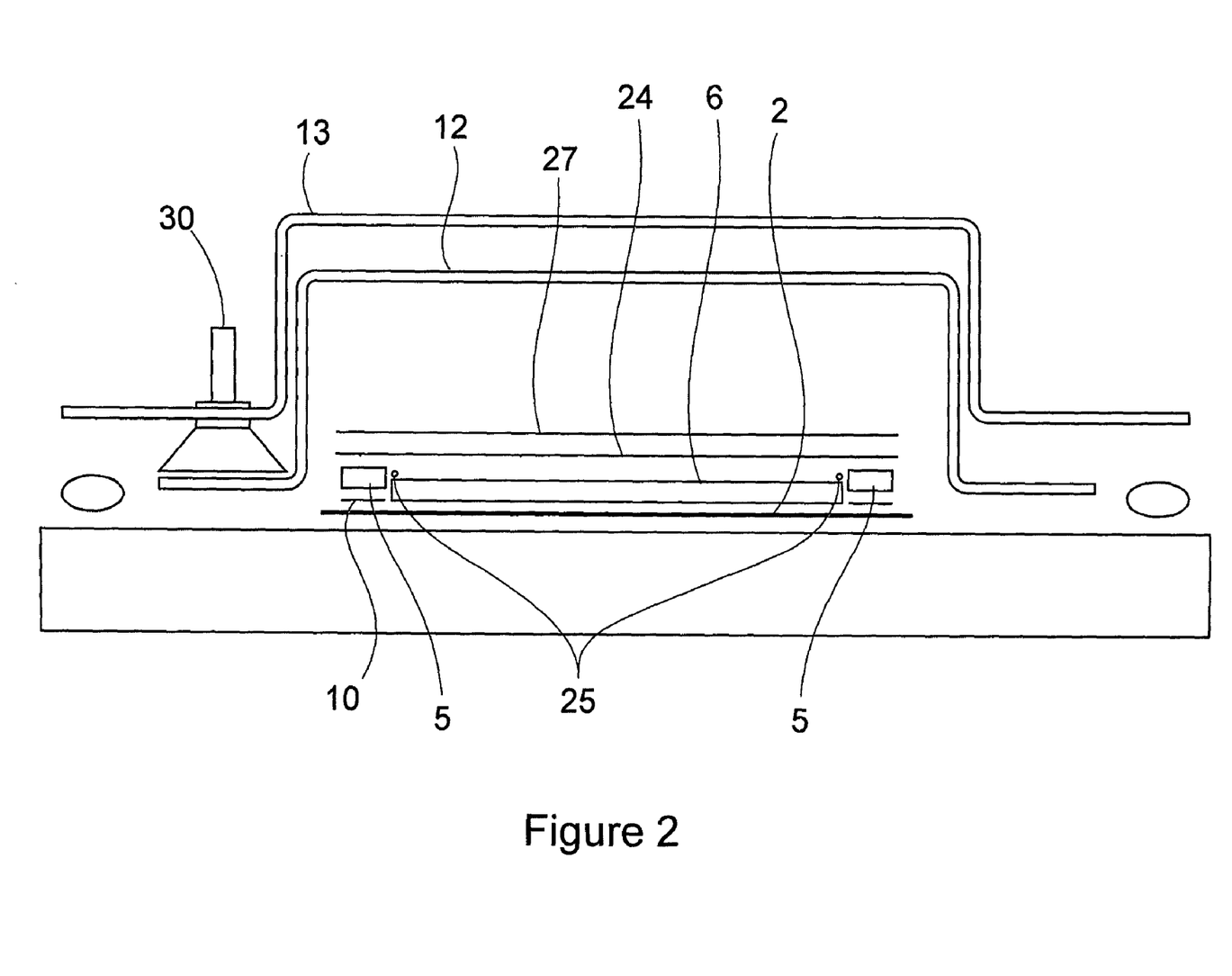
FIG. 2 is a diagrammatic view of a bond jig that includes a lay-up of a composite part for curing, bonding, or both.

Referring to FIG. 2, the debulked prepreg sheets are then cured by preferably placing them into an air circulating oven (not shown in the drawing) to increase their temperature while applying a vacuum (e.g., at least about 0.091 MPa (about 27 in-Hg)). The assembly for curing the debulked prepreg sheets is similar to that for debulking, but instead of using a perforated release film 11 as in FIG. 1, the assembly depicted in FIG. 2 comprises a non-porous release film 24.

Additionally, although not necessary, it may comprise an edge breather cord 25 (e.g., made from fiberglass) and a bleeder ply 27 (e.g., made from Style 120 or finer weave fiberglass fabric). The edge breather cord 25 is placed at the interface between the cork dam 5 and the composite part 6, which in this case is debulked prepreg sheets. Next, the non-porous release film 24 is placed over the composite part 6, the cork dam 5, and the edge breather cord 25. The bleeder ply 27 is placed over the non-porous release film 24. As is known to those of skill in the art, but not pictured, the breather cord 25 passes through the cork dam to facilitate the evacuation of air within the lay-up of prepreg sheets during the cure.

The temperature profile of the curing operation will tend to vary based on factors such as the materials being cured, but typically comprises heating the prepreg sheets at a rate that does not induce a material exothermic reaction (e.g., no more than about 4° F. per minute) to a cure temperature (e.g., at least about 170° F. (about 76° C.)), holding at the cure temperature a sufficient duration (e.g., at least about 6 hours), and then cooling the cured composite laminate, again at a rate that does not overly stress the materials or the structure (e.g., no more than about 2° F. per minute).

B. Bonding a Cured Skin and Honeycomb Core

The bonding of a cured skin and honeycomb core typically begins with removing the portion of the impregnated nylon peel ply where the honeycomb core will be placed, sanding the bonding surface of the cured skin, and removing the sanding dust. Then at least one layer of a film adhesive is placed on the surface of the cured skin and the assembly is debulked as depicted in FIG. 1, but the composite part 6 now comprises the cured base skin and the film adhesive. Next, the honeycomb core is placed on the film adhesive. This is then debulked (using a vacuum level that will not change the shape of the core, which is typically between about 10 and about 15 in Hg) as depicted in FIG. 1, but the composite part now comprises the cured base skin, the film adhesive, and honeycomb core. The debulked assembly of cured skin film adhesive and core (now composite part 6) are bonded as depicted in FIG. 1. The bonding is accomplished by applying a vacuum and heating the assembly to a bonding temperature (e.g., at least about 190° F. (about 82° C.)) for a sufficient duration (e.g., between about 2 and 3 hours) followed by cooling the bonded assembly at a rate that does not cause damage (e.g., no more than about 2° F. per minute).

C. Co-Bonding Composite Face Sheets

Figure 3:
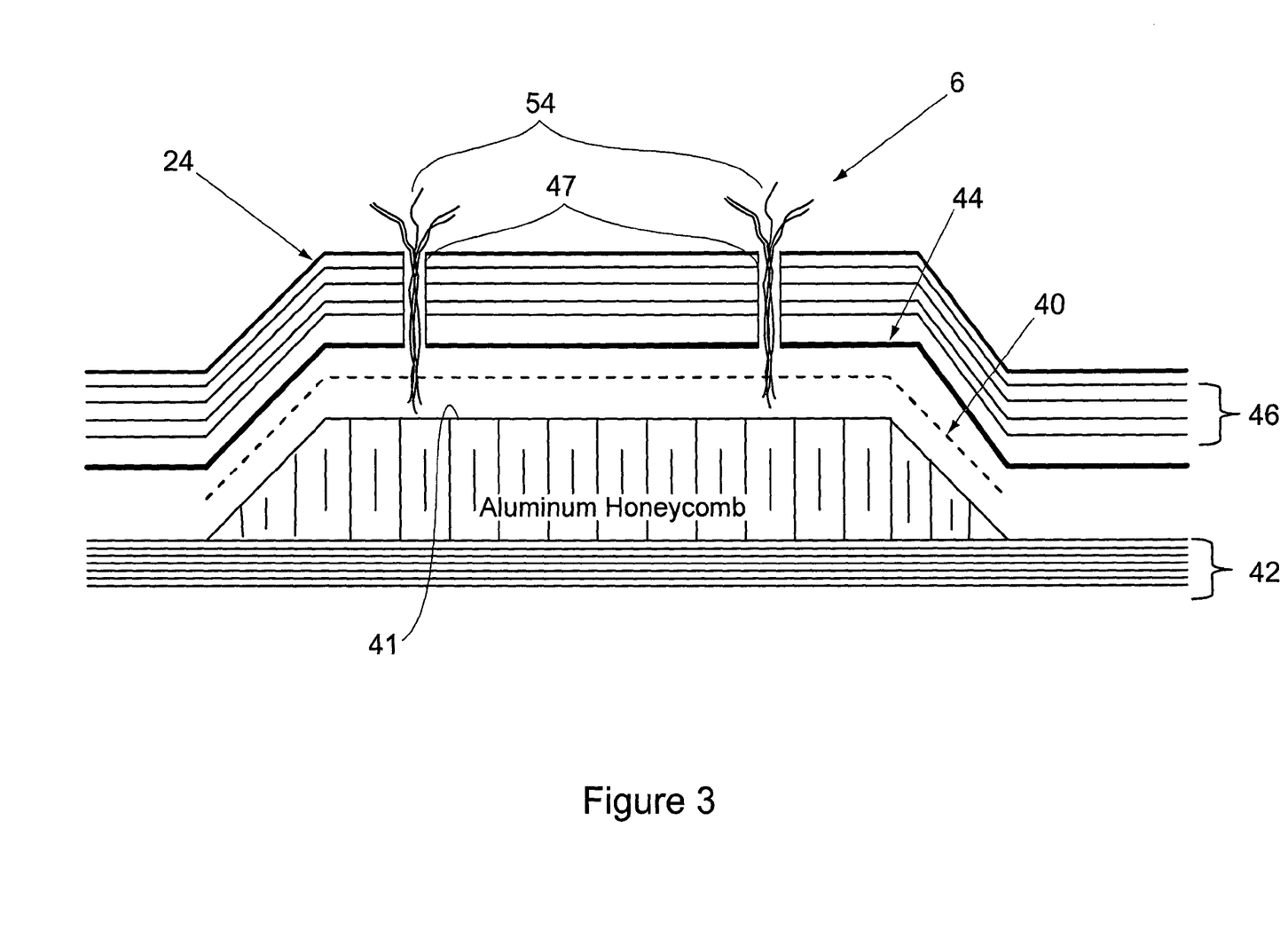
FIG. 3 is a diagrammatic view of a lay-up of a vented honeycomb composite structure.

The co-bonding typically begins by preparing the bonding surface of the base skin surrounding the core (e.g., removing peel ply, light sanding, and removing sanding dust). Next, the lay-up of the face skin is performed. The lay-up occurs while the assembly (the bonded base skin and core) are on the bond tool 4 and surrounded by cork dams 5 as depicted in FIG. 1. Referring to FIG. 3, the lay-up comprises placing at least one layer of dry scrim 40 on the honeycomb core 41, but not the base skin 42. Then an adhesive layer 44 is placed over the scrim 40. It is preferable to tack the scrim 40 to the film adhesive layer 44 before positioning it on the honeycomb core 41. Tacking is typically accomplished by debulking on a flat table using between about 5 and about 10 in Hg of vacuum pressure. This assembly now corresponds to the composite part 6 of FIG. 1 and is debulked.

After the debulk, the face skin prepreg sheets 46 are placed on the adhesive layer 44 and the assembly is debulked as depicted in FIG. 1. Debulking the prepreg sheets may be referred to as collation. Next, vents 47 are formed through the collated prepreg sheet 46 and any other layers such as the adhesive layer 44 and the scrim 40 that are between the outer surface of the face skin 48 and the honeycomb core 41. After forming the vents 47, the fibrous venting wicks 54 are inserted into and through the vents 47. The assembly is then bagged as depicted in FIG. 2 for the co-bonding (i.e., the combined cure or lamination of the face skin prepreg sheets 46 and the bonding of the laminated face skin, the honeycomb core 41, and the cured base skin 42) to form the honeycomb composite structure. The co-bonding operation tends to be identical or similar to that for forming a composite layer (e.g., the base skin). In other words, the exemplary vacuum pressures, temperatures, and durations set forth above are equally applicable.

In view of the foregoing, it will be seen that one or more of the advantages of the disclosure are achieved and attained. The above-described principles of the disclosure and its practical application to thereby enable others skilled in the art to best utilize the disclosure in various embodiments and with various modifications as are suited to the particular use contemplated. Further, as various modifications could be made in the constructions and methods herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above-described exemplary embodiments, but should be defined only in accordance with the following claims appended hereto and their equivalents.

What is claimed is:

1. A method for forming a honeycomb composite structure that comprises a skin and a honeycomb core having a plurality of cells, wherein the skin comprises at least one fibrous sheet and a polymer matrix and is cured or uncured, the method comprising:
    placing a scrim between the honeycomb core and the skin to allow flow of gasses and of the polymer matrix between cells of the honeycomb core during a vacuum forming portion of a bonding operation to bond the skin and the honeycomb core;
    forming the scrim with openings that are each smaller than each of said cells of the honeycomb core;
    perforating the skin with at least one vent sized to enable the gasses inside the honeycomb composite structure, and the polymer matrix, to be drawn through the vent during the vacuum forming portion of the bonding operation before the vent becomes sealed by the polymer matrix;
    further comprising placing a fibrous venting wick through the at least one vent before bonding the skin and the honeycomb core, wherein at least a portion of the fibrous venting wick is integrated into the skin during the bonding operation by the polymer matrix sealing the at least one vent; and
    bonding the skin and the honeycomb core during the bonding operation.

2. A method for forming a honeycomb composite structure that comprises a face skin, a base skin, and a honeycomb core disposed between and bonded to the face and base skins, the method comprising:
    forming a face lay-up over the honeycomb core and the base skin
        forming the face lay-up by:
        placing a scrim on the honeycomb core;
        placing an adhesive layer on the honeycomb core, and
        placing a multiplicity of prepreg sheets each having a fabric and a polymer matrix, on the adhesive layer;
    forming a vent through a portion of the face lay-up that overlies the honeycomb core;

sizing the vent to allow gasses within the honeycomb composite structure and the polymer matrix to flow therethrough before the vent is sealed by the polymer matrix during a vacuum forming portion of a co-bonding operation;

placing a fibrous venting wick through the vent;

integrating at least a portion of the fibrous wick with the face skin during the co-bonding operation; and performing the co-bonding operation to co-bond the face lay-up to laminate the multiplicity of prepreg sheets to form the face skin and to bond the face skin, the honeycomb core, and the base skin together.

3. The method of claim 2 wherein the operation of co-bonding the face lay-up comprises vacuum bagging the face lay-up, with the vent and fibrous venting wick therein, over the honeycomb core and base skin, applying a vacuum thereto, and increasing the temperature thereof to a cure temperature for a sufficient duration to laminate the multiplicity of prepreg sheets to form the face skin and to bond the face skin, the honeycomb core, and the base skin.

4. The method of claim 3 wherein the vacuum is at least about 27 in-Hg, the cure temperature is at least about 170° F., and duration is at least about 6 hours.

5. The method of claim 2 wherein the vent has a cross-sectional length that is no greater than about 0.125 in.

6. The method of claim 5 wherein the vent has a cross-sectional length that is at least about 0.05 in.

7. The method of claim 6 wherein the fibrous venting wick has a nominal cross-sectional diameter that is about that of the cross-sectional length of the vent.

8. The method of claim 2 further comprising forming a multiplicity of vents and placing a fibrous venting wick in each vent.

9. The method of claim 8 wherein the multiplicity of vents are at a concentration that is at least about 0.5 vents/ft$^2$.

10. The method of claim 9 wherein the concentration of vents is no greater than about 2 vents/ft$^2$.

11. The method of claim 8 wherein the multiplicity of vents comprise a concentration that is at least about 0.75 vents/ft$^2$.

12. The method of claim 11 wherein the concentration of vents is no greater than about 1.5 vents/ft$^2$.

13. The method of claim 2 wherein the face lay-up comprises an inner surface that contacts the adhesive layer and an outer surface, and the method further comprises fanning a portion of the fibrous venting wick extending outward from the outer surface of the face lay-up to minimize the formation mark-off on the face skin during the co-bonding.

14. The method of claim 13 further comprising trimming a portion of the fibrous venting wick that is outside the honeycomb composite structure.

15. The method of claim 14 further comprising bonding a fibrous patch over the sealed vent.

16. A method for forming a honeycomb composite structure that comprises:

providing a first skin;

providing a second skin;

providing a honeycomb core adapted to be disposed between and bonded to the first and second skins;

providing each of the first and second skins with at least one fibrous sheet and a polymer matrix that is cured or uncured;

placing a first surface of a scrim against the honeycomb core, the scrim being a dry scrim devoid of adhesive;

placing an adhesive layer of material against a second surface of the scrim;

placing at least one of the first and second skins over the adhesive layer;

using the scrim to allow a flow of gasses and of the polymer matrix between cells of the honeycomb core during a vacuum forming portion of a bonding operation to bond the at least one of the first and second skins and the honeycomb core;

perforating at least one of the first and second skins with at least one vent sized to further enable the gasses inside the honeycomb composite structure, and the polymer matrix, to be drawn through the vent during the vacuum forming portion before the vent becomes sealed by the polymer matrix;

further comprising placing a fibrous venting wick through the at least one vent before bonding the skin and the honeycomb core, wherein the venting wick is positioned generally perpendicular to a surface of the one of the first and second skins, and at least a portion of the fibrous venting wick is integrated into the at least one of the first and second skins during the bonding operation by the polymer matrix sealing the at least one vent; and bonding the at least one of the first and second skins and the honeycomb core.

17. A method for forming a honeycomb composite structure, comprising:

providing a skin;

providing a honeycomb core adapted to be disposed adjacent to and bonded to the skin;

providing the skin with at least one fibrous sheet and a polymer matrix;

placing a scrim between the honeycomb core and the skin to allow a flow of gasses and of the polymer matrix between cells of the honeycomb core during a vacuum forming portion of a bonding operation;

perforating the skin with a plurality of vents, with at least one of said vents being oriented generally perpendicular to a surface of the one fibrous sheet;

sizing the vents to enable the gasses inside the honeycomb composite structure, and the polymer matrix, to be drawn through the vent during the vacuum forming portion before the vents become sealed by the polymer matrix during the vacuum forming portion of the bonding operation;

further comprising placing a fibrous venting wick through the at least one of the vents before bonding the skin and the honeycomb core, wherein at least a portion of the fibrous venting wick is integrated into the skin during the bonding operation by the polymer matrix sealing the at least one vent;

bonding the skin and the honeycomb core during the bonding operation; and performing the vacuum forming portion of the bonding operation to bond the first skin and the honeycomb core.

18. A method for forming a honeycomb composite structure, comprising:

providing a skin;

providing a honeycomb core having a plurality of cells;

disposing the honeycomb core adjacent the skin;

forming the skin with at least one fibrous sheet and a polymer matrix;

placing a scrim between the honeycomb core and the skin, the scrim being adapted to allow a flow of gasses and a flow of the polymer matrix between cells of the honeycomb core during a vacuum forming portion of a bonding operation to bond the skin and the honeycomb core;

forming the scrim with openings that are each smaller than the cells of the honeycomb core;

perforating the skin with a plurality of vents, with at least one of said vents being oriented generally perpendicular to a surface of the at least one fibrous sheet, the vents further being shaped to form at least one of:
a circle;
an oval;
a square; and
a rectangular;
sizing the vents so that the vents each have a cross-sectional dimension of a maximum of about 0.125 inch, to enable gasses inside the honeycomb composite structure, and the polymer matrix, to be drawn through the vents during the vacuum forming portion before the vents become sealed by the polymer matrix;

further comprising placing a fibrous venting wick through the at least one of the vents before bonding the skin and the honeycomb core, wherein at least a portion of the fibrous venting wick is integrated into the skin during the bonding operation by the polymer matrix sealing the at least one vent; and drawing the gasses and the polymer matrix through the openings in the scrim and the vents in the skin to bond the skin, the scrim and the honeycomb core together during the bond operation.

* * * * *